United States Patent [19]
Zimmer

[11] 4,419,831
[45] Dec. 13, 1983

[54] METHOD AND APPARATUS FOR REPRODUCIBLY ASSOCIATING TWO MECHANICAL ELEMENTS WHICH ARE MOVABLE RELATIVE TO EACH OTHER

[75] Inventor: Ernst Zimmer, Friedberg, Fed. Rep. of Germany

[73] Assignee: Industrie-Werke Karlsruhe Augsburg Aktiengesellschaft, Fed. Rep. of Germany

[21] Appl. No.: 45,880

[22] Filed: Jun. 6, 1979

[30] Foreign Application Priority Data

Jun. 10, 1978 [DE] Fed. Rep. of Germany ....... 2825581

[51] Int. Cl.³ .............................................. G01B 5/00
[52] U.S. Cl. .......................... 33/181 R; 116/DIG. 21
[58] Field of Search ............ 33/172 R, 172 D, 180 R, 33/181 R; 116/DIG. 21

[56] References Cited

U.S. PATENT DOCUMENTS

| | | | |
|---|---|---|---|
| 2,611,187 | 9/1952 | Keene et al. | 33/180 R |
| 2,749,673 | 6/1956 | Balsiger | 33/181 R |
| 2,782,518 | 2/1957 | Tieman | 33/181 R |
| 4,098,221 | 7/1978 | Mickelson et al. | 116/115 |

FOREIGN PATENT DOCUMENTS

| | | | |
|---|---|---|---|
| 873751 | 4/1953 | Fed. Rep. of Germany | 33/181 R |
| 919740 | 3/1947 | France | 33/180 R |

Primary Examiner—Richard R. Stearns
Attorney, Agent, or Firm—McGlew and Tuttle

[57] ABSTRACT

A method of positioning a first part such as a rotatable shaft relative to a second part, such as a tubular receiving part comprises placing a defined surface area on one of the parts which is at an elevation distinct from the remaining area of this part surface, mounting a dial gauge having a sensing pin which is displaceable inwardly and outwardly to change the reading of the dial on the other of the parts, and engaging the pin on the surface of the first part while moving the parts relatively so that the needle moves over the surface of the first part, and recording the maximum deflection of the dial as a desired point of adjustment.

4 Claims, 1 Drawing Figure

METHOD AND APPARATUS FOR REPRODUCIBLY ASSOCIATING TWO MECHANICAL ELEMENTS WHICH ARE MOVABLE RELATIVE TO EACH OTHER

BACKGROUND OF THE INVENTION

This invention relates in general to means for associating one part relative to another and in particular to a new and useful method and apparatus for reproducibly adjusting the position of two mechanical parts relative to each other.

The present invention relates to a means for exactly and reproducibly adjusting the position of two mechanical parts, extending one within another, relative to each other. For example, if a shaft rotatable relative to a stationary component part is to be exchanged and, with regard to a unit connected to the shaft, the shaft head may have to be put in a definite position depending on certain reproducible limiting conditions. More specifically, in the field of so-called industrial robots or manipulators which perform certain reproducible movements through a program-controlled, electrically driven linkage, if the systems measuring the position and displacement of the individual axes of motion are to be exchanged, the axes must be brought into their so-termed mechanical zero position, whereupon the measuring system is brough into its so-termed electrical zero position. The intended result is that in any other position, the mechanism is consistent with the corresponding position of the measuring system and that there is no need for correcting the respective program control.

Another specific application connected to the employment of industrial robots is the exchange of one manipulator for another which is to be controlled by the same program. In such an instance, it is necessary to bring the mechanical and electrical zero positions of both units into agreement or at least into a definite relation to each other. To this end, the mechanical zero position of all axes must be fixed by means of a special gauge or measuring device during the first assembly, and, in addition, the manufacturing tolerances of the mechanism must not exceed certain limits. Deviations from the initial program which is stored by means of a punched or magnetic tape and may be recorded for the substitute manipulator, must not exceed a degree admissible in the specific case, considered through the entire field of operation.

A conventional method of reproducibly adjusting, for example, a rotary shaft relative to a housing in which the shaft is supported, is to provide each of the component parts with a locating bore and to bring the bores into alignment. By introducing a fitting pin, the alignment is checked and fixed. Another known method is to bring two opposite notches or scratches into alignment. As a rule, the accuracy required in the work with industrial robots cannot be achieved with these prior art methods. This is due to the always necessary tolerances on fit and to the difficulty in aligning scratches or notches with a satisfactory accuracy.

SUMMARY OF THE INVENTION

The present invention is directed to a means for adjusting two mechanical parts extending in each other, anytime in a simple, reproducible manner.

In accordance with a method of the invention, the first part such as a rotatable shaft is positioned relative to a second part such as a tubular receiving part by placing a defined surface area on one of the parts, such as on the shaft, which may be at a higher elevation or a lower elevation than the remaining area of this surface and mounting a dial gauge on the other of the parts which has a sensing needle which is deflected inwardly and outwardly and moving the parts relatively so that the needle rides over the surface and records the maximum deflection so as to sense an elevation or depression which is the desired point of adjustment.

A further object of the invention is to provide a device for positioning a first part relative to another which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
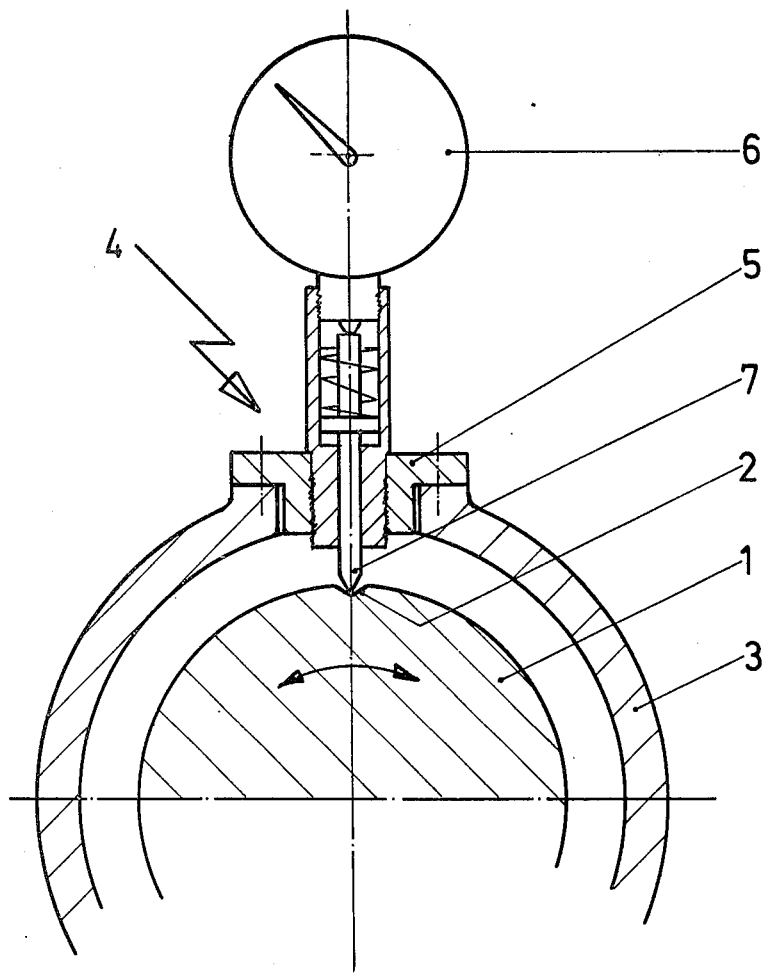
FIG. 1 is a partial sectional view of a device for exactly positioning one part relative to another part constructed in accordance with the invention.

FIG. 1 shows a rotary shaft 1 having a notch 2 in its surface, according to the teaching of the invention. This notch extends in to the axial direction of the shaft.

Shaft 1 rotates in a stationary, housing or tubular receiving part 3. When shaft 1 and part 3 are assembled, it is necessary to bring these two parts into an exact correlation, which is also reproducible with replacement parts. For this purpose, receiving part 3 is equipped with a sensing device 4 comprising a support 5 firmly connected to receiving part 3, and a commercially available dial gauge 6. As is well known, a dial gauge comprises a dial with a pointer which is operatively connected to a resiliently mounted contact pin 7.

The inventive device operates as follows: During the first, initial adjustment, support 5 is exactly aligned and fixed in position relative to shaft 1 which is to be brought in a definite correlation therewith. At any subsequent realignment, shaft 1 is introduced into the receiving part approximately in the desired position. Then, dial gauge 6 is screwed into support 5.

Further, shaft 1 which is rotatable beneath contact pin 7, is moved back and forth several times, to find the very deepest point of notch 2. The deepest point exactly corresponds to the predetermined position of shaft 1 relative to receiving part 3.

The inventive concept is surprisingly simple and makes it possible to obtain a reproducible optimal result anytime and without any actual measuring. As a matter of course, it makes no difference within the scope of the invention whether the shaft is provided with a notch or an elevation to be contacted by the pin. In the event that an elevation is provided, the highest point thereof corresponds to the desired position.

It is further obvious that the invention is not limited to applications of the kind described.

While specific embodiments of the invention have been shown and described in detail to illustrate the application of the principles of the invention, it will be understood that the invention may be embodied otherwise without departing from such principles.

What is claimed is:

1. An apparatus for reproducibly establishing a mechanical zero position for two relatively movable parts of an industrial robot, comprising:
    a tubular receiving part;
    a shaft part rotatably mounted in said tubular receiving part and having a circumferential surface and one radial position with a single notch at a lower radial position having a relatively small circumferential extent with respect to said circumferential surface; and
    a dial gauge fixed to said tubular receiving part over said circumferential surface of said shaft part, said dial gauge having a movable dial and a sensing needle operatively connected to said movable dial for moving said dial with movement of said needle, said needle engaged with said circumferential surface and positioned to engage in said notch with each full rotation of said shaft part so that said dial remains motionless as said shaft part rotates with said needle engaged on said circumferential surface and moves only when said needle engages said notch;
    whereby movement of said dial indicates the mechanical zero position between said tubular part and said shaft part.

2. An apparatus according to claim 1, wherein said notch is V-shaped, said needle positioned to engage a lowest base of said notch for maximum deflection of said dial, said maximum deflection of said dial corresponding to the mechanical zero position.

3. A method of reproducibly establishing a mechanical zero position between a tubular receiving part of an industrial robot and a shaft part rotatably mounted in the tubular receiving part, comprising:
    providing the shaft part with a circumferential surface at one radial position with a single notch in said circumferential surface at a lower radial position, the notch having a relatively small circumferential extent with respect to the circumferential surface;
    connecting a dial gauge to the tubular receiving part, the dial gauge having a movable dial and a sensing needle operatively connected to the dial for moving the dial with movement of the sensing needle, the dial mounted outside of the tubular receiving part, and the sensing needle extending through an opening in the tubular receiving part into engagement with the circumferential surface of the shaft part;
    positioning the dial gauge so that the sensing needle engages the notch once each time the shaft part rotates in the tubular receiving part, the engagement of the needle in the notch causing a maximum deflection of the needle with the needle and dial remaining stationary when the needle engages circumferential surface as the shaft part rotates; and
    establishing the mechanical zero position when the dial undergoes its maximum deflection.

4. A method according to claim 3, including providing the notch to have a V-shape so that maximum deflection of the dial occurs when the needle is at a lowest base of the V-shaped notch.

* * * * *

UNITED STATES PATENT AND TRADEMARK OFFICE
CERTIFICATE OF CORRECTION

PATENT NO. : 4,419,831
DATED : December 13, 1983
INVENTOR(S) : Ernst Zimmer

It is certified that error appears in the above-identified patent and that said Letters Patent is hereby corrected as shown below:

On the title page assignee should read

-- kUKA Schweissanlagen & Roboter GmbH --

Signed and Sealed this

Twenty-fourth Day of April 1984

[SEAL]

Attest:

GERALD J. MOSSINGHOFF

Attesting Officer     Commissioner of Patents and Trademarks